May 9, 1933. O. W. DECHAU 1,907,749
OPHTHALMIC MOUNTING
Filed Aug. 8, 1931

INVENTOR
OTTO W. DECHAU
BY
ATTORNEY

Patented May 9, 1933

1,907,749

UNITED STATES PATENT OFFICE

OTTO W. DECHAU, OF ROCHESTER, NEW YORK

OPHTHALMIC MOUNTING

Application filed August 8, 1931. Serial No. 555,882.

This invention relates to auxiliary spectacle frames having colored lenses mounted therein which are adapted to be held in place over the lenses mounted in a standard frame to protect the eyes from the glare caused by the reflection of sunlight or other strong light.

The object of the invention is to provide a simple, strong and durable frame for such colored lenses which, when not used, may be folded up.

This and other objects of the invention will be apparent from the detailed description of the invention which follows, reference being had to the accompanying drawing in which Figure 1 is a front elevation of the frame and the lenses mounted therein.

In the several figures of the drawing like reference numerals indicate like parts.

Figure 1:
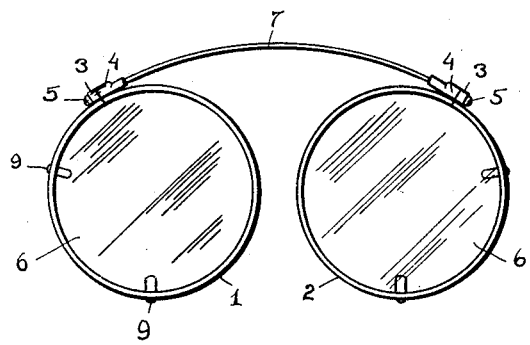
Figure 2:
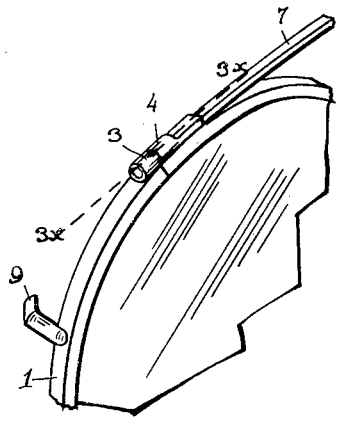
Figure 2 is an enlarged detail perspective view of a portion of the frame and the lens mounted therein.

The reflection of strong light rays into the eyes is injurious to the eyes, therefore many persons who wear glasses supplement the lenses thereof with colored glasses which filter the light rays before they reach the eyes. A convenient form of placing colored glasses in front of the lense of ophthalmic mountings is to provide an auxiliary ophthalmic frame having a flexible bridge member which connects the mountings of the colored glasses and provides an automatic adjustment of the auxiliary frame on the standard frame. The auxiliary frame, when anchored to the standard frame, will then hold the colored glasses superimposed over the spectacle lenses.

The auxiliary ophthalmic mounting, forming the subject matter of my present invention, comprises a simple, strong and durable frame which can readily be attached to or detached from the standard ophthalmic mounting without danger of breaking the frame. Furthermore the frame is constructed so that it will be hardly noticeable when attached to a standard ophthalmic mounting. As illustrated in the figures, the frame comprises a pair of circular mountings 1 and 2, each of which is formed up of a single length of suitably channeled stock. Fastened to the outside of the ends of each length of stock are the sleeve members 3 and 4 which are brought in line with each other when the mounting is formed up so that the ends of the stock can be fastened together to embrace and hold the colored glass in the mounting thus formed.

Sleeve member 3 has a clearance opening therethru so that the shank of the screw 5 with which the ends of the mounting are held together, can slide therethru to have its threaded end engage the internally threaded end of the sleeve member 4. In this way the screw 5 is adapted to draw the two sleeve members 3 and 4 and the ends of the mounting together until the colored glass 6 within the mounting is tightly gripped and held in place in the mounting.

Figure 3:
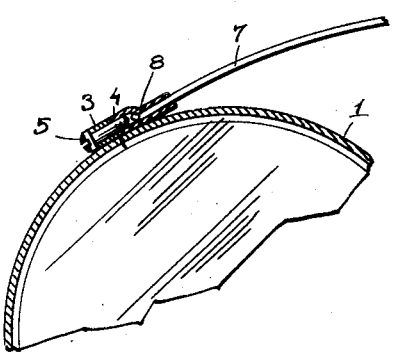
Figure 3 is a longitudinal sectional view of the portion of the frame illustrated in Figure 2, the section being taken on the line $3x$—$3x$ of Figure 2.

As illustrated the sleeve member 4, which is threaded at one end to receive the threaded end of the screw 5, is extended in order to have the end of the flexible bridge member 7 with its slightly turned up end 8 slide thereinto, as illustrated in Figure 3. Then after the formed up end of the bridge member has been inserted into the sleeve, the portion of the sleeve member which surrounds the upturned end of the bridge member is flattened over the bridge member to hold it clamped in place therein. The end of the bridge member is then held against movement in one direction in the sleeve member by the collapsed portion thereof and against movement in the opposite direction by the end of the screw 5 which is threaded into the opposite end of this same sleeve member, and closes the other end thereof. In this way the fastening members of the mounting, as well as the anchoring and fastening means of the bridge member of the auxiliary ophthalmic mounting, are combined. This materially simplifies the construction of such a mounting and makes it exceptionally strong and durable.

To hold the auxiliary frame in place on the standard frame, a pair of bent lugs 9, 9 are provided on the rims thereof and project rearwardly therefrom to engage around the rims of the standard mounting.

I claim:

An ophthalmic mounting having a pair of split rims connected by a bridge member, a cylindrical sleeve member provided on each of said split rims at each end thereof, a screw passing thru the sleeve member of one end of the split rim and threaded into the opposing sleeve member of the other end of the same split rim to lock said split rims together, offset ends formed on said bridge member, said offset ends projecting into the open end of said threaded sleeve member against the end of the screw threaded thereinto, said threaded sleeve members being collapsed behind said offset ends of said bridge member to clamp and anchor said offset ends of said bridge member into said threaded sleeves between the collapsed portion thereof and the ends of the screws threaded into the opposite end thereof.

OTTO W. DECHAU.